United States Patent Office 3,845,040
Patented Oct. 29, 1974

3,845,040
PROTECTION OF STEROID CARBONYL GROUP
BY ENOLISATION
Derek Harold Richard Barton, London, England, and
Robert Henry Hesse, Cambridge Mass., assignors to
Research Institute for Medicine and Chemistry Inc.,
Cambridge, Mass.
No Drawing. Filed June 5, 1973, Ser. No. 367,339
Claims priority, application Great Britain, June 12, 1972,
27,376/72
Int. Cl. C07c 173/00
U.S. Cl. 260—239.55 D             23 Claims

ABSTRACT OF THE DISCLOSURE

The invention comprises a process for metal hydride reduction of a compound containing a carbonyl group requiring protection against such reduction, whereby the compound is treated in a non-hydroxylic solvent under oxygen-free conditions with an alkali metal base soluble in the solvent to enolise the said carbonyl group, and then is subjected to reduction with a metal hydride reducing agent and subsequently protonated to regenerate the carbonyl group. In particular an 11-keto steroid further carrying one or more keto groups in the 3- and/or 17- or 20-positions may be selectively reduced to the corresponding 11β-hydroxy steroid.

---

This invention relates to the production of keto groups during metal hydride reduction of other reducible groupings.

It is frequently desirable in synthetic organic chemistry to effect selective metal hydride reduction of a particular group in a molecule also containing a reducible keto group. In particular it is often desirable to reduce one of two or more carbonyl groups in a molecule as, for example, in the reduction of a 3,11,17-triketo steroid. Other groups susceptible to metal hydride reduction which it may be desirable to reduce in the presence of a carbonyl group include esters groups, amide groups, nitro groups and cyano groups.

While metal hydride reducing agents do show different reactivity with carbonyls and other reducible groupings in different environments, it is usually necessary to protect the carbonyl group which is to remain unreduced in such a way that it will withstand the metal hydride without affecting the efficiency of the reduction. While various protecting groups such as ketals and enamines have been used to protect selectively certain carbonyl functions and in spite of the considerable effort devoted to this topic, the introduction and removal of carbonyl protecting groups is by no means always a trivial operation: there are, for instance, no wholly adequate protecting groups for steroidal, 1,4-diene-3-ones.

We have now found that where the carbonyl group to be protected can be selectively enolised, the enolate so formed is inert to the metal hydride reduction and thus provides a useful protective derivative. In molecules where a carbonyl group is to be protected while a different kind of group is to be reduced there is usually no problem of selectivity. Where, however, one carbonyl group is to be reduced while others are protected, it will be seen that selective enolisation is required. The unprotected carbonyl may thus be difficult or impossible to enolise, for example by virtue of a hindered position as in the case of the steroid 11-keto group, or the absence of α-hydrogen atoms.

Alternatively the unprotected carbonyl may readily form an enolate provided this is of lower thermodynamic stability than those to be protected in which case anion formation under equilibrating conditions will lead to the formation of the correct enolate as in the case of the steroid 9,11-enolate (vide infra).

Enolisation may be effected by the treatment of the carbonyl compound under oxygen-free conditions in a non-hydroxylic solvent with an alkali metal base solution in the solvent. Usually, the reaction will be effected at a substantially reduced temperature, e.g. −50° C. or below. Enolisation of this type is described and discussed in some detail in Belgium patent specification No. 759,289. In general a lithium or sodium base such as a hydride, amide, alkylamide, triarylmethyl, acetylide or bis-tertiary-silylamide may be used although a base other than a lithium base may be required under certain circumstances. Thus where a steroid-1,4-diene-3,11-dione is used the 3-enolate is produced relatively easily using any of the bases mentioned above. To produce the 9(11)-enolate, a non-lithium base should be used and the 3-enolate first formed should be allowed to react with unreacted 3,11-dione whereby the 11-keto group is converted into enolate and the 3-elonate grouping reconverted into a 3-keto group.

According to the present invention therefore we provide a process for metal hydride reduction of a compound containing a carbonyl group requiring protection against such reduction, whereby the compound is treated in a non-hydroxylic solvent under oxygen-free conditions with an alkali metal base soluble in the solvent to enolise the said carbonyl group, and then is subjected to reduction with a metal hydride reducing agent and subsequently protonated to regenerate the carbonyl group.

As the elonate product is relatively unstable it is desirable to effect the metal hydride reduction without undue delay and conveniently the reagent is added as soon as the enolisation is complete. The solvent for both reactions will conveniently be a cyclic or acyclic ether, for example tetrahydrofuran, dioxan or diglyme. Other suitable solvents include the aromatic hydrocarbons, e.g. benzene and toluene, and tertiary amines, especially trialkylamines such as triethylamine and cyclic amines such as N-methylpyrrolidine.

The metal hydride reducing agent used depends on the nature of the group to be reduced. Under the conditions of the enolisation an alkali metal aluminium hydride, especially lithium aluminium hydride, is most suitable although to avoid undesirable byproduct it is desirable, for example in steroid reductions, to use milder variants such as the lithium dihydro-bis (alkoxy)aluminates, e.g. lithium dihydrobis(2-methoxyethoxy)aluminate known as "Red-Al."

When using metal hydride reducing agents of the above-mentioned type it is generally advantageous to use an excess which must then be destroyed at the end of the reaction for example by addition of reactive compounds such as carbon dioxide, alkanols, ethyl acetate or water. These compounds cannot however easily be used in the present circumstances as they would either react directly with or protonate the enolate to yield a carbonyl group which would then be exposed to attack by undestroyed reducing agents.

We have found however, that ammonia and amines are advantageous for smoothly breaking down the excess of metal hydride without harming the enolate. When the reducing agent has been destroyed, the enolate can subsequently be protonated, e.g. by addition of water to regenerate the carbonyl group and hydrolyse lithium complexes.

We have found that a triarylmethyl base, especially trityl lithium (triphenylmethyl lithium) smoothly provides the desired enolate which may be reacted with the metal hydride without complication. The use of this type of reagent leads to the presence in the product mixture of a triarylmethane, e.g. triphenylmethane, which may be removed easily by trituration. The visible colour-change attending the protonolysis of trityl lithium is an added advantage of the use of this reagent.

As indicated above, the enolisation is preferably effected at a reduced temperature, generally below −50° C. A temperature of about −78° C. may advantageously be used and the metal hydride reducing agent added at that temperature. Where the enolisation is incomplete or slow at such a low temperature, as for example in the bis-enolisation of 11-ketoprogesterone or of 11-dehydrodexamethasone 17,21-n-butyl-orthopropionate, the reaction may be warmed to 0° C. until enolate formation is complete and then cooled to about −78° C. again before addition of metal hydride.

As indicated above, the reaction is generally applicable in organic chemistry, being particularly applicable to the selective reduction of one or more carbonyl groups in the presence of other reducible carbonyl groups. One particularly preferred embodiment of the present invention comprises a process for the selective metal hydride reduction of a compound containing two or more carbonyl groups, whereby the compound is treated in a non-hydroxylic solvent under oxygen-free conditions with an alkali metal base soluble in the solvent to enolise the carbonyl group or groups required to remain unreduced and is then subjected to reduction with a metal hydride reducing agent and subsequently protonated to regenerate the enolised carbonyl group or groups. The protonation may conveniently be effected by "quenching" the reaction by addition of water, preferably acidified e.g. with a mineral acid such as hydrochloric or sulphuric acid.

The reaction is generally applicable to reduction of any carbonyl bearing compound and may thus be applied to substrates in which the carbonyl group is carried by a cyclic or acyclic hydrocarbon system of, for example, 1 to 30 carbon atoms, such as aliphatic and cycloaliphatic keto esters and more complex structures such as steroids and terpenes. The enolisable carbonyl group itself may be either part of a cyclic system or external to it. Thus, for example, the 20-keto group of a steroid is part of an aliphatic chain external to a ring while the 3-keto group is in a ring; both these groups may be protected by enolisation.

The invention is of special interest in metal hydride reductions of keto-steroids, in particular those involving the selective reduction of an 11-keto-steroid to a corresponding 11β-hydroxy-steroid in the presence of keto groups at the 3- and/or 17- or 20-positions. Other groups present may be simultaneously reduced, for example a 21-carboxylate group.

In general, the steroid may be of the gonane, androstane, oestrane, pregnane, 19-norpregnane or cholestane steries. Various substituents may be present, for example halogen atoms at the 6-, 9α- and/or 16-positions, especially fluorine atoms; hydroxy groups at the 16-, 17- and/or 21-positions in the form of protected derivatives such as a 16,17-ketonide e.g. the acetonide, a 17,21-orthoester, e.g. the n-butylorthopropionate, a 21- base-stable ether, e.g. a trityl or tetrahydropyranyl ether or an alkylsilyl ether such as a trimethylsilyl or t-butyldimethylsilyl ether, or a 17,20:20,21-bisalkylidenedioxy system; acyloxy groups, e.g. alkanoyloxy groups such as acetoxy, propionyloxy, butyryloxy and valeryloxy groups at the 16,17- and/or 21-positions; a carboxylate group at the 21-position, e.g. an alkylcarboxylate group such as a methyl carboxylate group; and methyl groups at any of the 6-, 10-, 13- and 16-positions. Double bonds may be present, for example in the 1-, 4- and/or 17(20)-positions.

Examples of the use of the process according to the invention include the "one step" conversion of 11-ketoprogesterone into 11β-hydroxy-progesterone and the similar conversion of methyl 3,11-dioxopregna-4,17(20)-dien-21-oate into 11β,21-dihydroxy-3-oxo-pregna-4,cis-17(20)-diene. The latter transformation which entails the reduction of an ester function as well as a ketone in the presence of a "masked" α,β-unsaturated ketone requires three steps as currently practiced in the commercial synthesis of hydrocortisone (J. Amer. Chem. Soc, 77, 4436, 7955). Another example is the reduction of 11-dehydrodexamethasone 17,21-n-butyl orthopropionate to give dexamethasone 17-21-n-butylorthopropionate which involves the protection of the corticosteroid side chain as an enolised 17,21-ortho ester function. This is of considerable significance as such ortho esters are normal intermediates in the synthesis of the commercially important 17-acyloxy or 17,20-bis acyloxy or 17,20-bis acyloxy corticosteroid analogs.

A further example is the reduction of 9α-fluoro-3,11-20 - trioxo - 16α,17α,21 - trihydroxypregna - 1,4-diene 16,17-acetonide and the 6α,9α-difluoro analogue to the corresponding fluorinated 3,20-dioxo-11β,16α,17α, 21-tetrahydroxy-pregna-1,4-diene 16,17-acetonides. In this case the 21-hydroxy group should be protected before the reduction and this may conveniently be achieved by forming a base-stable labile ether such as a trityl or tetrahydropyranyl ether or an alkylsilyl ether, e.g. the trimethylsilyl or t-butyl-dimethyl silyl ether. The labile ether can then easily be cleared with acid.

It will thus be seen that the process according to the present invention provides a very useful tool in the synthesis of a wide range of important chemical products, especially a number of anti-inflammatory steroids.

A complication attendant in the use of metal enolates as protecting groups according to the present invention is the tendency of enolised α,β-unsaturated ketones to undergo protonation at the α-carbon leading to the formation, on work-up, of the unconjugated isomer. For optimal yields it is thus necessary to find the best conditions in any particular case for minimising such protonation. However it is in general a simple matter to isomerise to the desired structure during work up by treating the solution of unconjugated isomer with acid or base.

It will be apparent that conversion of a substrate into a metal enolate, followed by metal hydride reduction *in situ* of non-enolised groups, especially carbonyl functions, is a convenient and attractive approach to the problem of selective reduction. This method is potentially quite versatile as the selectivity of the enolisation operation may be manipulated by judicious choice of kinetically or thermodynamically controlled enolisation reactions as indicated, for example in the above-mentioned Belgian patent specification and in Chem. Comm. 1497 (1969) and 1498 (1969).

The following examples further illustrate the invention. Unless otherwise stated all enolisations and subsequent metal hydride reductions were effected at about −78° C. No attempts were made to optimise the yields.

EXAMPLE 1

Reduction of 17,20:20,21-bismethylenedioxypregna-1,4-diene-3,11-dione 17,20:20,21 - bismethylenedioxypregna-1,4-diene-3,11-dione (prednisone BMD) (recrystallised from methanol/methylene chloride m.p. 315° C. [$\alpha_D$]CHCl$_3$ (c.=4.7)=+45° C.)

(1.0 g.) under argon in THF (distilled from lithium aluminium hydride (LAH) under argon) (30 ml.) was vacuum degassed and flushed with argon.

Triphenylmethane (1.22 g.) in THF distilled under argon from LAH (20 ml.) was vacuum degassed and n-butyl lithium in hexane (2.1 ml., 1 equiv.) added. The mixture was warmed gently and then left for thirty minutes at which time the Gilman test for alkyl lithium was negative. The solution of triphenylmethyl lithium (trityl lithium) was added with stirring to the steroid solution until a pink end point.

(a) Reduction with lithium dihydrobis(2-methoxyethoxy)aluminate (Red-Al)

The above-mentioned solution of steroid enolate was chilled to −78° C. and Red-Al (2.0 ml.) added. After 30 minutes no prednisone BMD remained and gaseous ammonia was passed into the reaction mixture until no further hydrogen was evolved and the mixture was then quenched with 5% sulphuric acid.

The steroidal portion was extracted with ether/methylene chloride (5:2) and the extracts were washed with water until neutral and dried over magnesium sulphate. The dried extracts were evaporated to an off-white solid which was shown by t.l.c. to consist of the steroidal material together with trityl derivatives. Extraction with hot hexane left a colourless residue (860 mg.) which after crystallisation from methanol/methylene chloride yielded 740 mg.

(b) Reduction with lithium aluminium hydride

A solution of the enolate prepared as above was cooled to −78° C. and a solution of LAH in THF (1.0 ml., 5 mmole) was added. The mixture was allowed to warm to room temperature by which time no prednisone BMD remained. The mixture was worked up as in (a) but the acidification was effected with 5% hydrochloric acid to give a yield of 750 mg.

Both samples consisted of 11β-hydroxy-17,20:20,21-bismethylenedioxypregna - 1,4 - dien-3-one (prednisolone BMD) together with a less polar component which was present as the major portion and was shown by NMR to be the deconjugated isomer. Isomerisation to prednisolone BMD was effected in virtually 100% yield by treatment of the samples in chloroform/ethanol with chloroform saturated with hydrogen chloride to give after evaporation and recrystallisation from ethyl acetate, colourless needles m.p. 267 and 271° C., $$[\alpha_D]^{22°}_{CH_2Cl_2} = -26° \ (C.=1.0).$$

Prednisolone BMD

| NMR: | τ | H | | Protons of— |
|---|---|---|---|---|
| | 2.7 | 1 | (d) J=10 Hz | C-1. |
| | 3.7 | 1 | (d) J=10 Hz | C-2. |
| | 4.0 | 1 | (s) | C-4. |
| | 4.9 | 4 | (m) | BMD methylenes. |
| | 6.0 | 2 | (s) | C-21. |
| | 8.5 | 3 | (s) | C-19. |
| | 8.8 | 3 | (s) | C-18. |

IR: $\nu_{max}$ (Nujol) 3550 (m), 1580 (s), 1660 (s), 1100 (s), 950 (s) cm.$^{-1}$.

UV:

$\lambda^{MeOH}_{max.}$ 242 mn. (ε=13600).

Δ⁶ Prednisolone BMD

| NMR: | τ | H | | Protons of — |
|---|---|---|---|---|
| | 2.8 | 1 | (d) J=10 Hz | C-1. |
| | 4.0 | 1 | (d) J=10 Nz | C-2. |
| | 4.9 | 5 | (m) | C-6 and BMD methylenes. |
| | 6.0 | 2 | (s) | C-21. |
| | 8.5 | 3 | (s) | C-19. |
| | 8.8 | 3 | (s) | C-18. |

IR:

$\nu^{Nujol}_{max.}$ 3650 (c), 1680 (s), 1100 (s), 950 (s) cm.$^{-1}$.

The literature characterisation for prednisolone BMD gives a melting point of 270 to 274° C., [α_D]=−20°.

EXAMPLE 2

Reduction of 9α-fluoro-16α-methyl-17,20:20,21-bis-methylenedioxy-pregna - 1,4 - diene-3,11-dione (11-dehydrodexamethasone BMD)

11-dehydrodexamethasone BMD (1.0 g.) under argon in THF (distilled from LAH under argon) (40 ml.) was vacuum degassed.

Trityl lithium was added with stirring to the steroid solution under argon until a pink end point.

(a) Reduction with Red-Al

Red-Al (3 ml., a ten-fold excess) was added to one fifth of the above enolate. The reaction was complete after 4 hours. Gaseous ammonia was passed until no further hydrogen was involved and the solution was chilled to −78° C. and aqueous sulphuric acid added. The aqueous mixture was extracted with ether and the ether extract washed with water, dried over magnesium sulphate and evaporated to give a yellow solid. Trituration of this solid with hot hexane left a colourless solid (90 mg.) identical with 9α-fluoro-11β-hydroxy-16α-methyl-17,20: 20,21-bismethylenedioxy-pregna - 1,4 - dien-3-one (dexamethasone BMD) by IR, NMR and t.l.c.

(b) Reduction with LAH

The enolate prepared from the steroid (0.5 g.) was chilled to minus 78° C. and LAH/THF solution (0.5 ml., 2.5 mmole) was added. The mixture was warmed to room temperature and worked up as in (a) but acidifying with 5% aqueous hydrochloric acid to give a colourless residue (300 mg.). The product was a mixture of isomers which was converted into dexamethasone BMD by treatment with chloroform/hydrogen chloride/ethanol. The product was recrystallised from methylene chloride to give dexamethasone BMD m.p. 305 to 312° C. [α_D] CHCl₃=34° C. (c.=0.5).

| NMR: | τ | H | | Protons of— |
|---|---|---|---|---|
| | 2.8 | 1 | (d) J=10 Hz | C-1. |
| | 3.7 | 2 | (m) | C-2.4. |
| | 4.9 | 4 | (m) | BMD methylene. |
| | 6.0 | 2 | (s) | C-21. |
| | 8.4 | 3 | (s) | C-19. |
| | 8.8 | 3 | (s) | C-18. |
| | 9.05 | 3 | (s) J=6 Hz | C-16 methyl. |

IR:

$\nu^{Nujol}_{max.}$ 3500 (m), 1660 (s), 1620 (s), 1090 (s), 9040 (s), 892 (s) cm.$^{-1}$.

UV:

$\lambda^{MeOH}_{max.}$ 239 nm. (ε=12000).

Dexamethasone BMD prepared from dexamethasone has been characterised in the literature as having a melting point of 310 to 320° C., [α_D] CHCl₃=−37.5 (c.=0.4).

EXAMPLE 3

Reduction of pregn-3-ene-3,11,20-trione 11-ketoprogesterone 1.0 g. in the THF distilled from LAH under argon (20 ml.) was vacuum degassed and flushed with argon. Triphenylmethane (2.44 g.) in THF (ex. LAH) (30 ml.) was vacuum degassed and flushed with argon. n-Butyl lithium in hexane (4.7 ml., 1 equiv.) was added and the mixture warmed to complete the reaction. The trityl lithium was added with stirring to the steroid until a pink end point.

(a) Reduction of the enolate with LAH

The enolate prepared from 11-ketoprogesterone (3.0 g.) was chilled to −78° C. LAH/THF solution (10 ml., 50 mmole) was added and the mixture allowed to warm to room temperature. Gaseous ammonia was passed until no further hydrogen was evolved and a 5% mixture of concentrated hydrochloric acid in water (50 ml.) was added. Methylene chloride was added to this mixture and the organic layer was separated, washed to neutrality with water, dried over magnesium sulphate and evaporated to give a yellow residue. Trituration of this residue with hot hexane followed by cooling left the steroidal portion as an insoluble oil which was chromatographed on alumina with methylene chloride to give a colourless solid (1 5 .) identified as 11β-hydroxy progesterone.

| NMR: | τ | H |
|---|---|---|
| | 4.3 | 1H (s). |
| | 5.6 | 1H (broad). |
| | 7.9 | 3H (s). |
| | 8.6 | 3H (s). |
| | 9.1 | 3H (s). |

IR:

$\nu_{max.}^{KBr.}$ 3500 (s), 3950 (s), 1700 (s), 1660 (vs), 1620 (m), 1350 (m), 875 (m) cm.$^{-1}$.

Recrystallization from ethylacetate/hexane gave 11β-hydroxy-pregn-4-ene-3,20-dione (11β - hydroxyprogesterone): m.p. 183 to 160° C. Analysis: C, 76.23; H, 9.08%. Required: C, 76.33; H, 9.16%. $(\alpha_D)+213°$ (c.=0.5 in acetone).

UV:

$\lambda_{max.}^{MeOH}$ 242 m. (ε=12200).

The characterisation reported in the literature gives a melting point of 186 to 188° C., $[\alpha_D]+212°$ in acetone. The above reaction was repeated but with addition of the steroid to the trityl lithium. A yield of approximately 45° of 11β-hydroxy progesterone together with some more polar impurities was obtained.

EXAMPLE 4

The reduction of methyl 3,11-dioxopregna-4,17(20)-dien-21-oate

Methyl 3,11-dioxopregna-4,17(20)-dien-21-oate (500 mg.) under argon in THF distilled from LAH under argon (10 ml.) was vacuum degassed, flushed with argon and chilled to —78° C. Trityl lithium (5 mmole) was prepared as before and the molarity of the solution checked against a standard THF solution of cholestanone (500 ml.). The trityl lithium solution (3.2 ml., 1 equiv.) was added slowly to the cold solution of the steroid with stirring to give the monoenolate.

(a) Reduction with a small excess of LAH

LAH in THF (0.4 ml., 2 m. equiv. of H⁻, 1.4 equiv. with respect to steroid) was added to the enolate prepared as above at —78° C. and the solution allowed to warm to room temperature. Gaseous ammonia was passed until no further hydrogen was evolved, water was added and the mixture was poured into methylene chloride. The organic layer was separated, washed to neutrality and dried over magnesium sulphate. T.l.c. in acetone/methylene chloride indicated two major products, one minor product and no starting material. The two major products were both slightly more polar than the starting material and the minor product was considerably more polar. The major products were isolated on Alumina 3 and were then treated in methylene chloride/methanol with hydrogen chloride in methylene chloride to isomerise the less polar Δ⁵ form to the Δ⁴ form and the product was crystallised to produce colourless needles from ethylacetate/hexane. The IR and NMR of the product then identified it as being methyl 3-oxo-11β-hydroxypregna-4,17(20)-dien-21-oate, m.p. 203° C.

IR:

3400 (s), 1715 (s), 1655 (s), 1180 (s), 880 (s) cm.$^{-1}$.

$\nu_{max.}^{Nujol}$

| NMR: | τ | H | Protons of— |
|---|---|---|---|
| | 4.4 | 2 (broad) | C-4, 20 |
| | 5.6 | 1 (broad) | C-11 |
| | 6.4 | 3 (s) | CH₃-O |
| | 8.5 | 3 (s) | C-19 |
| | 8.7 | 3 (s) | C-18 |

UV:

$\lambda_{max.}^{MeOH}$ 237 nm. (ε=2100) $[\alpha_D]=+103°$ (c.=0.8 in acetone).

(b) Reduction with a large excess of LAH

The reduction in (a) was repeated using steroid (1 g.) and LAH/THF solution (3 ml., 5.2 equiv.) to give a methylene chloride solution after extraction of the quenched reaction mixture. This solution was divided equally into two parts and both evaporated to dryness. The first part was triturated with hot hexane, the liquid decanted and the residue dissolved in methanol. The second portion was dissolved in methanol, chilled to —78° C., filtered and then warmed to room temperature. Both reactions were then treated identically as described below. Potassium acetate was added to the methanol solutions and then they were left overnight. Separation between dilute potassium hydroxide and methylene dichloride followed by separation of the organic layer, washing, drying and vacuum evaporation left colourless oils. The oils were dissolved in pyridine at 0° C. and treated with acetic anhydride (3 ml.) in pyridine to bring the total volume to about 20 ml. The solutions were stood at between 3 and 4° C. overnight and then poured into ice/water. Extraction with methylene chloride and removal of pyridine from the organic layer with dilute sulphuric acid followed by washing, drying and evaporation under reduced pressure left residues similar in weight and t.l.c. components. The products were combined. Separation on preparative silica plates gave 11β,21-dihydroxy-3-oxo-pregna-4,cis-17(20)-dien-21-acetate (450 mg.); $[\alpha_D]CH_2Cl_2=+122°$ (c.=2.1) m.p. 188 to 190°.

| NMR: | τ | H | Protons of— |
|---|---|---|---|
| | 4.3 | 1 (s) | C-4. |
| | 4.8 | 1 broad (d) | C-20. |
| | 5.2 | 2 broad (d) | C-21. |
| | 5.5 | 1 hump | C-11. |
| | 7.9 | 3 (s) | Acetate. |
| | 8.5 | 3 (s) | C-19. |
| | 8.8 | 3 (s) | C-18. |

IR:

$\nu_{max.}^{KBr}$ 3400 (s), 2900 (s), 1730 (s), 1660 (vs), 1620 (w), 1240 (s), 1020 (m), 960 (m), 880 (m) cm.$^{-1}$.

UV:

$\lambda_{max.}^{MeOH}$ 241 nm. (ε 14700).

EXAMPLE 5

Reduction of 9α-fluoro-17α,21-dihydroxy-16α-methylpregna - 1,4 - diene-3,11,20-trione 17α,21-n-butylorthopropionate (11-dehydrodexamethasone 17,21-n-butylorthopropionate)

11-dehydrodexamethasone 17,21 - n - butylorthopropionate (251 mg., 0.5 mmole) in THF was vacuum degassed and flushed with argon. Trityl lithium (prepared and titrated as above) (3.86 ml., 2 equiv.) was added with stirring to the steroid solution at —78° C. A pink end point was reached approximately half-way through the addition (indicating the completion of the monoenolisation). The mixture was warmed to approximately —20° C. and the pink colour disappeared, to be reformed permanently on addition of further trityl lithium solution. The enolate solution was chilled to −78° C. and LAH solution in THF (0.4 ml., 4 equivs.) was added. The solution was warmed to room temperature, gaseous ammonia was passed in until no further hydrogen was evolved, water was added and the mixture was poured into methylene chloride. The organic layer was separated, washed to neutrality and dried over magnesium sulphate. The desired product and its $\Delta^5$ isomer were found to be present (t.l.c.).

The reaction was repeated as above but using LAH/THF (0.8 ml., 8 equiv.). The extracts were found to be identical with those of the first reaction.

The two solutions were thus combined and evaporated to give a colourless solid. Chromatography on alumina (50% hexane/methylene chloride) gave trityl products on the solvent front. The minor products were incompletely resolved and eluted with 30% hexane/methylene chloride. The major products were eluted with 10% hexane/methylene chloride to give on evaporation a colourless solid (225 mg.) which by t.l.c. was shown to be a mixture of dexamethasone 17,21-n-butylorthopropionate and its $\Delta^5$ isomer. The mixture was dissolved in acetic acid with a trace of water and stood at room temperature overnight. The reaction mixture was poured into water, neutralised with sodium bicarbonate and extracted into methylene chloride. The methylene chloride layer was acidified with hydrogen chloride in methylene chloride/methanol and the product isolated was found by t.l.c. to be identical with an authentic sample of dexamethasone 17-propionate. The organic layer was washed with bicarbonate and evaporated to give a colourless solid which was recrystallised from ether/acetone/hexane to yield colourless crystals. M.p. 215 to 223° C. (not depressed by genuine material), $[\alpha_D]=-5.5°$ (c.=1.27 in chloroform), UV: $\lambda_{max}$ 237 nm. ($\epsilon$ 16000).

IR:

$\nu_{max.}^{KBr.}$ 3300 (s), 1740 (s), 1710 (s), 1660 (vs), 1620 (s), 1605 (s), 1060 (m), 1190 (m), 935 (m), 900 (m) cm.$^{-1}$.

| NMR: | $\tau$ H | Protons of— |
|---|---|---|
| | 2.65 1 (d) J=10 Hz | C-1 proton. |
| | 3.62 1 (d) J=10 Hz | C-2 proton. |
| | 3.80 1 (s) | C-4 proton. |
| | 3.60 1 broad hump | C-11 proton. |
| | 5.65 2 two signals 5 Hz. apart. | C-21 protons. |
| | 8.49 3 (s) | C-19 protons. |
| | 8.8–9.1 9 (m) | C-18 protons, C-16 methyl protons, propionate methyl protons. |

The IR and NMR are those expected of the required product and the melting point and $[\alpha_D]$ are in agreement with those described in the literature (see below).

Preparation of dexamethasone 17-propionate

Dexamethasone 17,21-n-butylorthopropionate (100 mg.) in acetic acid (3 mil.) and water 2 drops was stood for 30 minutes, poured into ice water and neutralised with sodium bicarbonate. The product was extracted into methylene chloride and extracts washed and dried over magnesium sulphate and evaporated to dryness to yield a colourless solid. This product was recrystallised from hexane/acetone/ether to give colourless crystals m.p. 216 to 222° C. $[\alpha_D]=5.8°$ (CHCl$_3$ c.=2.26).

UV:

$\lambda_{max.}^{MeOH}$ 237 nm. ($\epsilon$ 16800).

IR:

$\nu_{max.}^{KrB}$ 3300 (s), 1740 (s), 1710 (s), 1660 (vs), 1620 (s), 1605 (s), 1190 (m), 1060 (m), 935 (m), 900 (m).

Dexamethasone 17-propionate is reported in the literature to have a melting point of 219 to 233° C., $[\alpha_D]$ −6° (chloroform c.=1.0) when prepared by a method similar to that described above.

EXAMPLE 6

Reduction of 9α-fluoro-3,11,20-trioxo-16,17α-dihydroxy-21 - tetrahydropyranyloxy - pregna - 1,4 - diene 16,17-acetonide In a manner analogous to that of Example 2, 9α-fluoro-3,11,20-trioxo - 16α,17α-dihydroxy - 21 - tetrahydropyranyloxy-pregna-1,4-diene 16,17-acetonide was enolised and reduced with LAH to give a mixture of isomers. On treatment with acid isomerised the $\Delta^5$ byproduct and at the same time removed the protecting group at the 21-position to yield 9α-fluoro - 3,20-dioxo-11β,16α,17α,21-tetrahydropregna-1,4-diene 16,17-acetonide, m.p. 292 to 294°.

EXAMPLE 7

Reduction of 6α,9α - difluoro - 3,11,20 - trioxo-16α,17α-dihydroxy - 21 - tetrahydropyranyloxypregna-1,4-diene 16,17-acetonide In a manner similar to that of Example 6, the 6α-fluoro compound was enolised and reduced with LAH. Treatment with acid yielded 6α,9α-difluoro-3,20-dioxo-11β,16α,17α,21-tetrahydroxypregna-1,4-diene 16,17 acetonide, m.p. 265 to 266° C.

What is claimed is:

1. In a process for reducing a steroid wherein said steroid is reduced by treatment with an alkali aluminium hydride and said steroid contains a carbonyl group requiring protection against said reduction, the steps of protecting said carbonyl group by reacting said steroid with an alkali metal base under oxygen-free conditions to enolise said carbonyl group and regenerating said carbonyl group after said reduction by treating the resulting reduced steroid with a source of protons.

2. A process as claimed in claim 1 in which metal hydride reduction is effected immediately after enolate formation.

3. A process as claimed in claim 1 in which the enolisation is carried out in a cyclic or acyclic ether, aromatic hydrocarbon or tertiary amine.

4. A process as claimed in claim 1 in which the metal hydride reducing agent is lithium aluminium hydride or a lithium dihydrobis (alkoxy) aluminate.

5. A process as claimed in claim 4 in which the hydride is lithium dihydrobis-(2-methoxyethoxy)-aluminate.

6. A process as claimed in claim 1 in which any excess of alkali metal aluminum hydride reducing agent remaining at the end of the reaction is destroyed by addition of ammonia or an amine.

7. A process as claimed in claim 1 in which the reduced enolate is protonated to regenerate the carbonyl group by addition of aqueous acid.

8. A process as claimed in claim 1 in which the alkali metal base used to form the enolate is a triarylmethyl base.

9. A process as claimed in claim 8 in which the base is triphenylmethyl lithium.

10. A process as claimed in claim 1 in which the enolisation is effected at a temperature of 0° C. or less.

11. A process as claimed in claim 10 in which the temperature is below −50° C.

12. A process as claimed in claim 11 in which the temperature is about −78° C.

13. A process as claimed in claim 1 in which the steroid contains at least two carbonyl groups and the carbonyl group or groups requiring protection are selectively enolised.

14. A process as claimed in claim 1 in which the steroid to be reduced is a keto-steroid.

15. A process as claimed in claim 14 in which the steroid carries substituents selected from halogen atoms at the 6-, 9α- and/or 16-positions; hydroxy groups at the 16-, 17- and/or 21-positions in the form of protected derivatives; acyloxy groups at the 16-, 17- and/or 21-positions; a carboxylate group at the 21-position; and methyl groups at any of the 6-, 10-, 13- and 16-positions.

16. A process as claimed in claim 15 in which the steroid carries double bonds in any of the 1-, 4- and 17(20)-positions.

17. A process as claimed in claim 15 in which the halogen atoms are fluorine atoms.

18. A process as claimed in claim 15 in which the protected derivatives of hydroxy groups are 16,17-ketonides, 17,21-orthoesters, 21-base-stable ethers, or 17,20:20,21-bisalkylidenedioxy systems.

19. A process as claimed in claim 15 in which the acyloxy groups are alkanoyloxy groups.

20. A process as claimed in claim 14 in which said ketosteroid is an 11-keto steroid further carrying at least one keto group in at least one of the 3-, 17- and 20-positions and is selectively reduced to the corresponding 11β-hydroxy steroid.

21. A process as claimed in claim 20 in which a 21-carboxylate group present is also reduced.

22. A process as claimed in claim 14 in which the steroid to be reduced is pregn-4-ene-3,11,20-trione; 17,20:20,21-bismethylenedioxy-pregna - 1,4 - diene-3,11-dione; 9α-fluoro - 16α - methyl-17,20:20,21-bismethylenedioxy-pregna-1,4-diene - 3,11 - dione; methyl 3,11-dioxopregna-4,17(20)-dien-21-oate; 9α-fluoro-16α-methyl-17α, 21-dihydroxypregna-1,4-diene - 3,11,20 - trione 17α,21-n-butylorthopropionate; 9α - fluoro-3,11,20-trioxo-16α,17α, 21-trihydroxypregna-1,4-diene - 16,17 - acetonide; or 6α, 9α - difluoro-3,11,20-trioxo-16α,17α,21-trihydroxypregna-1,4-diene 16,17-acetonide.

23. A process as claimed in claim 14 in which an α,β-unsaturated ketone is enolised and the product after reduction is treated with acid or base to isomerise any unconjugated byproduct.

No references cited.

HENRY A. FRENCH, Primary Examiner

U.S. Cl. X.R.
260—397.1, 397.45